United States Patent
Kajitani et al.

[19]

[11] Patent Number: 5,113,991
[45] Date of Patent: May 19, 1992

[54] RELEASE DEVICE FOR A CLUTCH

[75] Inventors: Koji Kajitani; Minoru Abe; Shinpei Fujiwara, all of Neyagawa, Japan

[73] Assignee: Kabushiki Kaisha Daikin Seisakusho, Osaka, Japan

[21] Appl. No.: 445,676

[22] PCT Filed: Apr. 12, 1989

[86] PCT No.: PCT/JP89/00400

§ 371 Date: Nov. 30, 1989

§ 102(e) Date: Nov. 30, 1989

[87] PCT Pub. No.: WO89/10493

PCT Pub. Date: Nov. 2, 1989

[30] Foreign Application Priority Data

Apr. 26, 1988 [JP] Japan .............................. 63-56467[U]
May 6, 1988 [JP] Japan .............................. 63-60400[U]
May 18, 1988 [JP] Japan .............................. 63-65367[U]

[51] Int. Cl.⁵ ............................................. F16D 25/063
[52] U.S. Cl. ................................ 192/98; 192/85 CA; 192/91 A
[58] Field of Search ................... 192/98, 85 CA, 91 A

[56] References Cited

U.S. PATENT DOCUMENTS

| 4,561,531 | 12/1985 | Young et al. | 192/85 CA |
| 4,585,106 | 4/1986 | Shirley | 192/85 CA |
| 4,609,087 | 9/1986 | Shirley | 192/98 |
| 4,620,625 | 11/1986 | Ladin | 192/98 |
| 4,708,228 | 11/1987 | Leigh-Monstevens | 192/85 CA |
| 4,821,627 | 4/1989 | Leigh-Monstevens | 192/85 CA |
| 4,827,834 | 5/1989 | Leigh-Monstevens | 192/85 CA |
| 4,869,355 | 9/1989 | Corral et al. | 192/85 CA |

FOREIGN PATENT DOCUMENTS

| 51-2734 | 1/1976 | Japan . |
| 51-66224 | 5/1976 | Japan . |
| 54-42853 | 3/1979 | Japan . |
| 57-44876 | 9/1982 | Japan . |
| 59-1820 | 1/1984 | Japan . |
| 64-30974 | 2/1989 | Japan . |

Primary Examiner—Allan D. Herrmann
Assistant Examiner—Nicholas Whitelaw
Attorney, Agent, or Firm—Armstrong, Nikaido, Marmelstein, Kubovcik & Murray

[57] ABSTRACT

A release device for a clutch including a cylinder aligned coaxially with a release bearing, a cylindrical piston adapted to fit in a cylindrical operation chamber of the cylinder, and an annular packing mounted adjacent an annular end of the piston within the operation chamber, the operation chamber being connected to an external operating pressure control device through a liquid pressure control passage, the piston being axially connected, at its one end positioned outside the operation chamber, to the release bearing, wherein an annular slide member is fixed to an end of the packing which adjoins the piston, the slide member being greater in hardness than the packing and lower in friction coefficient against the piston than the packing.

4 Claims, 3 Drawing Sheets

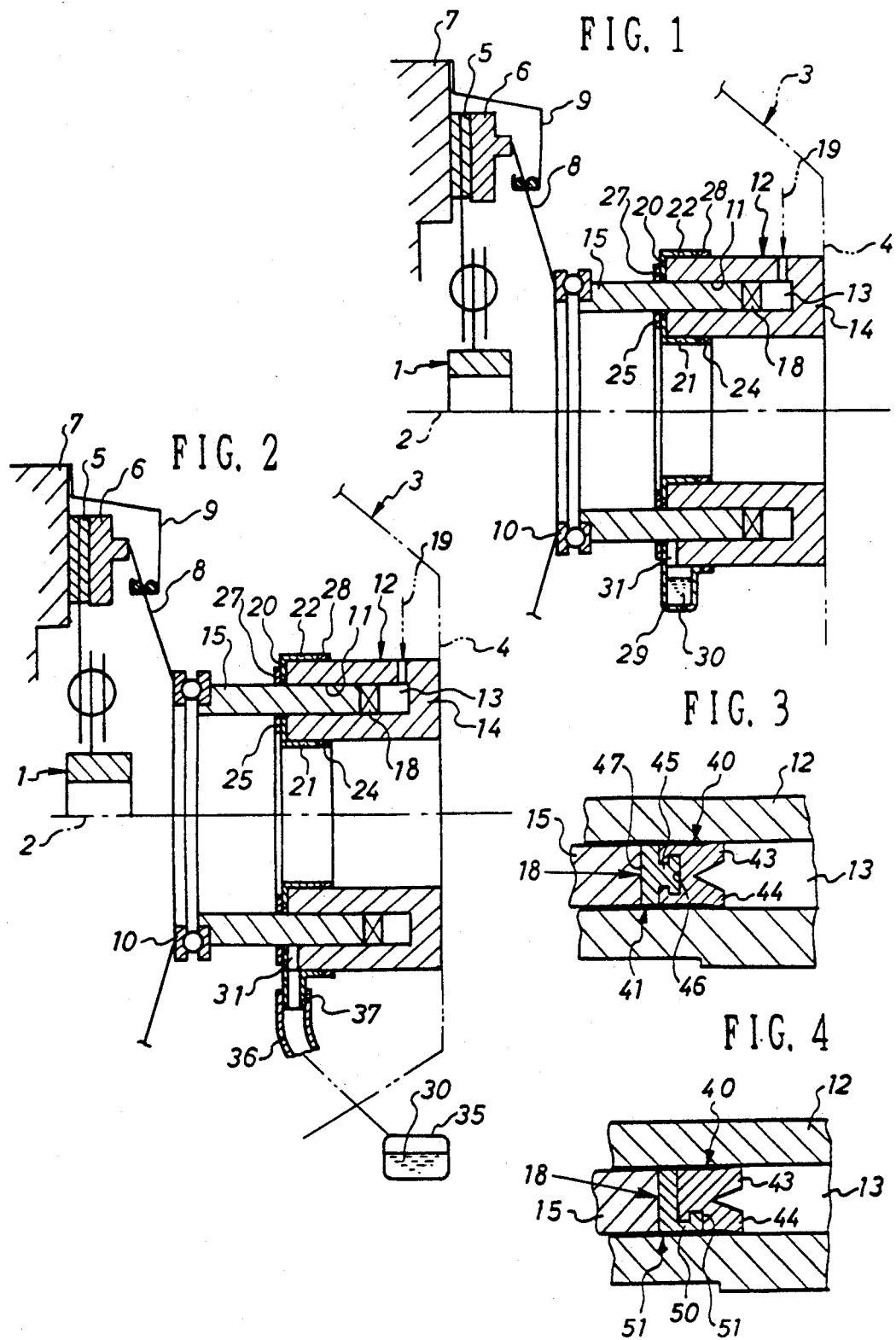

RELEASE DEVICE FOR A CLUTCH

BACKGROUND OF THE INVENTION (1) Field of the Invention

This invention relates to a release device for a friction clutch for use in automobiles or the like and, more particularly, to a release device in a clutch adapted to be connected and disconnected by a release bearing, of the type in which the release bearing is driven by a cylinder device.

(2) Description of the Prior Art

Hitherto, there has been known a friction clutch in which a cylinder device for driving a release bearing is disposed adjacent the release bearing in a clutch housing.

According to such arrangement, the cylinder is formed with a cylindrical operation chamber therein and a cylindrical piston fits in the operation chamber. The piston projects outwardly from one end of the operation chamber, the projecting end of the piston being connected to the release bearing. The piston has an annular rubber packing secured to its end within the operation chamber through the intermediary of a concave-convex fitting portion so as to prevent leakage of operation liquid from the operation chamber.

With the above arrangement, however, it is inevitable that the piston tilts slightly relative to the cylinder during operation so that the packing-mounted end of the piston may shift radially. The packing, which is secured to the piston through the concave-convex fitting portion, may get out of position or become distorted when the piston shifts as above mentioned, with the result that the desired sealing function cannot be obtained.

The packing is merely fitted on the piston at the concave-convex portion and is not securely fixed by adhesive or the like to the piston. Therefore, when the operation chamber is not in pressurized state, the packing may become separated from the piston, and if, when the packing is in such separated condition, the operation chamber is pressurized whereby pressure is applied to the packing, the pacing may, in an extreme case, fall down or get so deformed that it is even turned over.

Further, despite the provision of such packing or seal, it may not be possible to positively prevent the operation liquid within the operation chamber from leaking outward, in trace amounts, though, passing through the clearance between the piston and the cylinder. If such leakage occurs, the liquid may adhere to the facing of the clutch, with the result that clutch slippage or judder may be caused.

A liquid pressure control passage pipe for supply of liquid pressure to the operation chamber is connected to the cylinder. A seal for the joint between the pipe and the cylinder may be deteriorated by heat or otherwise, which may result in poor sealing function.

A further problem is that assembly work for the joint is rather difficult because the pipe must be fixed to the cylinder while a predetermined compressive force is applied to the seal.

The object of the invention is to provide a release device for a clutch which eliminates the foregoing problems.

SUMMARY OF THE INVENTION

In order to accomplish the above object, according to the invention there is provided a release device for a clutch including a cylinder coaxially aligned with a release bearing, a cylindrical piston fitted in a cylindrical operation chamber of the cylinder, and an annular packing mounted in position adjacent an annular end of the piston within said operation chamber, said operation chamber being connected to external operating pressure control means through a liquid pressure control passage, an end of said piston outside said operation chamber being axially connected to the release bearing, characterized in that an annular slide member is fixed to an end of said packing which adjoins said piston, said slide member being greater in hardness than said packing and lower in friction coefficient against said piston than said packing.

The release device shown further comprises a cylindrical hollow portion defining said cylindrical operation chamber and provided in an axially intermediate portion of the cylinder, said hollow portion having an opening formed in one end of the cylinder on the release bearing side, said piston projecting outward through said opening of said hollow portion, said one end of the cylinder being covered with a cover sidably fitted in liquid tight condition on the inner and outer peripheries of the piston, an operation liquid passage formed at the lower end of the cylinder and at a site adjacent said cover which extends from said hollow portion to the outer periphery of the cylinder, and an operation liquid reservoir to which is connected the lower end of said passage.

According to the above arrangement, if the piston gets tilted or radially shifts, mere slide takes place between the slide member and the piston, there being no possibility of packing movement with the piston. Therefore, the packing is prevented from getting out of position or becoming distorted.

The slide member functions as a reinforcing member or backing member for the packing. Therefore, even if the operation chamber is pressurized and accordingly pressure is exerted on the packing when both the packing and the slide liable to fall down or become deformed.

Furthermore, according to the above arrangement, even when a trace amount of operation liquid from the operation chamber flows passing through a clearance between the piston and the cylinder until it reaches a location adjacent the opening of the hollow portion, such liquid flows downward along the operation liquid passage into the operation liquid reservoir. Thus, there is no possibility of operation liquid leaking externally of the cylinder.

BRIEF DESCRIPTION OF THE DRAWINGS

FIG. 1 is a schematic sectional view of a device representing one embodiment of the invention;

FIG. 2 is a schematic sectional view of another embodiment;

FIG. 3 is a fragmentary enlarged sectional view illustrating a seal configuration;

FIG. 4 is a fragmentary enlarged sectional view of another embodiment;

DESCRIPTION OF THE PREFERRED EMBODIMENTS

Figure 5:
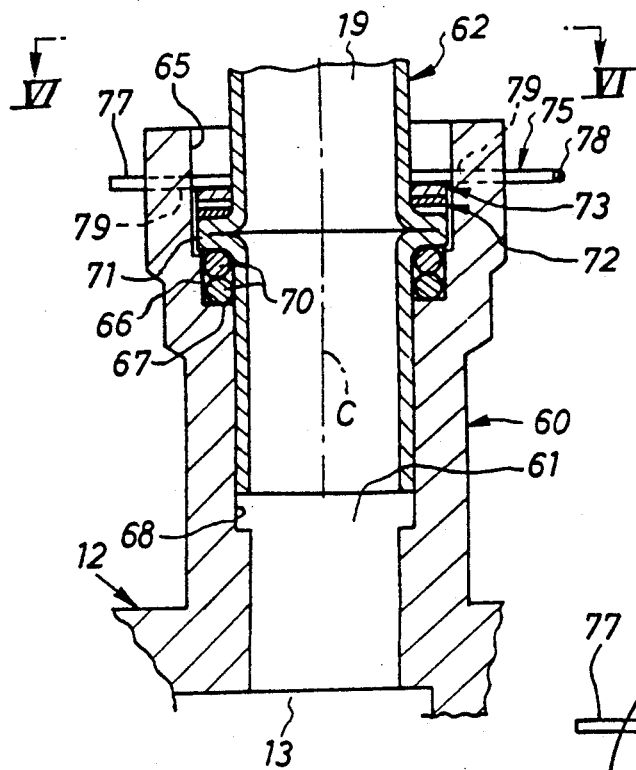
FIG. 5 is a fragmentary enlarged sectional view illustrating a connection arrangement for a control passage.

In FIG. 1, an output shaft 2 (of which only a center line is shown) connected to a clutch disc 1 extends through a hole in an end wall 4 of a clutch housing 3 up to a transmission (not shown). The clutch disc 1 has a facing 5 on its outer periphery. Clutch connection is obtained by pressing the facing 5 against a flywheel 7 by means of a pressure plate 6. A diaphragm spring 8 for urging the pressure plate 6 toward the flywheel 7 is seated on the back of the pressure plate 6. The diaphragm spring 8 is supported by a clutch cover 9 and its inner peripheral portion is connected to a release bearing 10. The release bearing 10 is positioned opposite the clutch disc 1 across the diaphragm spring.

A cylinder 12 is disposed between the release bearing 10 and the end wall 4. The cylinder 12 is generally cylinder shaped and positioned about the output shaft 2 in concentric relationship therewith, the cylinder 12 being supported at one end in abutment with the end wall 4. The cylinder 12 has a hollow portion 11 in a radially intermediate portion of its cylindrical body. The hollow portion 11 extends in parallel with the cylinder 12, its end on the end wall 4 side being closed by an end wall 14 of the cylinder 14, its opposite side end being open toward an end 20 of the cylinder 12 on the release bearing 10 side.

A cylindrical piston 15 is slidably fitted in the hollow portion 11, and a operation chamber 13 is defined between one end of the piston 15 and the cylinder end wall 14. An annular seal 18 is provided at the one end of the piston 15. The other end of the piston 15 projects outwardly from the end opening of the hollow portion 11, the projecting end being connected to the release bearing 10.

The operation chamber 13 is connected to an external operation liquid supply control passage 19 through an internal passage of the cylinder 12. The passage 19 is connected, outside the clutch housing 3, to a pressure control mechanism not shown, so that when a clutch pedal is stepped on, the control mechanism supplies a high pressure operation liquid (e.g., brake fluid) to the control passage 19 to pressurize the operation chamber 13 with the result that the piston 15 moves toward the clutch disc 1 and the release bearing 10 also moves in same direction to deform the diaphragm spring 8 to a clutch disconnecting position (i.e., a position at which force against the pressure plate 6 is released) so that the clutch is disconnected.

The above mentioned arrangement and function thereof is well known. The end 20 of the cylinder 12 through which the hollow portion 11 is open is covered with a pair of covers 21, 22. The cover 2 is an annular member positioned radially inwardly of the piston 15 which is mounted in close contact with the end 20 of the cylinder 12 and an inner peripheral portion adjacent thereto. Annular seals 24, 25 are mounted on the inner and outer peripheral edges of the cover 21, the outer peripheral edge of the cover 21 being slidably and liquid-tightly fitted on the inner periphery of the piston 15 through the seal 25.

The cover 22 is likewise a generally annular member mounted on the end 20 of the cylinder 12 and a peripheral portion adjacent thereto, with seals 27, 28 being mounted on the inner and outer peripheral edges of the cover 22. The inner peripheral edge of the cover 22 is slidably and liquid-tightly fitted on the outer periphery of the piston 15 through the seal 27.

A lowermost portion of the cover 22 is integrally formed with a downwardly projecting portion 29, a liquid reservoir 30 being defined within the portion 29. A portion of the cylinder end 20 at the lower end thereof which is axially external of the piston 15 is formed with a generally radially (vertically) extending groove 31. The groove 31 extends from the inner periphery of the hollow portion 11 to the outer periphery of the cylinder 12.

According to this arrangement, if operation liquid within the operation chamber leaks passing through a clearance between the piston 15 and the cylinder 12 until it reaches a site prior to the cover 22, such liquid flows down along the groove 31 and is collected into the liquid reservoir 30. Thus, there is no possibility of operation liquid leaking outside the cylinder 12.

In the embodiment of FIG. 1, the liquid reservoir 30 is formed by utilizing a portion of the cover 22, but alternatively it may be defined by a tank 35 separate from the cover 22 as FIG. 2 shows. In the embodiment shown in FIG. 2, the tank 35 is disposed outside the clutch housing 3 and the liquid reservoir 30 is connected to the lower end of the groove 31 by means of a hose 36. For connecting the hose 36, a cylindrical portion 37 on which the hose 36 is fitted is integrally formed with the cover 22 at the lower end thereof.

Nextly, the construction of the seal 18 is described in detail. In FIG. 3 which shows a fragmentary schematic enlarged view of the embodiment of FIG. 1, the seal 18 consists of packing 40 and a slide member 41. The packing 40 is an annular rubber member having lips 43, 44 at portions thereof spaced apart from the piston 15 which respectively contact the inner and outer peripheries of the operation chamber 13. The slide member 41 is formed of a synthetic resin material which is harder than the packing 40 and lower in friction coefficient against the piston 15 than the packing 40, and extends in an annular pattern along the end of the piston 15 and end of the packing 40.

The slide member 41 is formed with an annular projection 45 integrally therewith. The projection 45 projects from a radially intermediate portion of the slide member 41 and toward the packing 40, its front end portion extending radially outwardly and inwardly. The packing 40 is formed with an annular groove 46 in which the projection 45 is tightly fitted. The packing 40 and the slide member 41 are tightly fixed together through the projection 45 and groove 46 being fitted together.

The end of the slide member 41 which is opposite from the projection 45 has a generally radially extending flat annular surface, and in its condition as shown, it slidably engages the front surface of the piston 15 in surface contact relation. The slide member 41 is not fixed to the piston 15 and, therefore, when the operation chamber 13 is in nonpressurized state, the slide member 41 may be positioned away from the piston 15.

According to the above mentioned arrangement, when the operation chamber 13 is pressurized as above noted, the pressure in the operation chamber 13 is transmitted to the piston 15 through the packing 40 and slide member 41, so that the piston 15 moves as above mentioned. When the piston 15 moves in such a way, the piston 15, as already mentioned, may get slightly tilted and its seal 18 side end may radially shift. Even in such case, the piston 15 merely slides relative to the end surface 47 of the slide member 41 because the slide member 41 is formed of a material having a lower friction coefficient against the piston 15, and because the slide member 41 is in contact on its radially flat surface with the piston 15; and the slide member 41 and packing 40 will not shift radially together with the piston 15, nor will they become tilted. Therefore, the packing 40 is maintained in position, with lips 43, 44 seated in optimum condition on the inner and outer peripheries of the operation chamber 13. Thus, satisfactorily high sealing function can be obtained by the packing 40.

When the operation chamber 13 is not in pressurized condition, the slide member 41 may separate from the piston 15. If, in such case, the operation chamber 13 is pressurized, the packing 40 is pressed by the resulting pressure toward the piston 15. During such movement, the slide member 41 is prevented against abnormal deformation or from falling down (e.g., the lips 43, 44 recontacting the outer periphery of the operation chamber 13), because the packing 40, though it is not supported by the piston 15, is supported by the hard slide member 41 on the side opposite to the pressure-applied side.

The slide member 41 may be mounted to the packing 40 in manner as shown in FIG. 4. In the arrangement of FIG. 4, the slide member 41 has no such projection 45 as shown in FIG. 3, but instead, it has a cylindrical projection 50 in its inner peripheral portion. The projection 50 extends radially inwardly of the packing 40 and has a radially outwardly extending annular projection 51 at its front end. The inner peripheral portion of the packing 40 is formed with a notch in which the projection 50 or projection 51 fits in a tight fit pattern.

Nextly, the arrangement for interconnection of the control passage 19 and the internal passage of the cylinder 12 is explained.

In FIG. 5 which shows a fragmentary enlarged view of the embodiment of FIG. 1, the cylinder 12 has, at the clutch housing end wall 4 (FIG. 1) side end of its cylindrical body, has an outwardly projecting cylindrical boss 60 formed integrally therewith. The boss 60 is formed therein with an internal passage 61 communicating with the operation chamber 13, the internal passage 61 being connected to the earlier mentioned control passage 19.

The control passage 19 has a portion connected to the internal passage 61 which is defined by a pipe 62, the pipe 62 being connected to the boss 60 in manner as described below.

The inner passage 61 has a larger diameter portion 65 at its open end side which is continued to a slightly smaller diameter portion 66 through an annular stepped portion 66, which in turn is continued to a further smaller diameter portion 68 through an annular stepped portion 67.

The pipe 62 has its front end portion inserted into the internal passage 61 as far as the smaller diameter portion 68. Between the pipe 62 and the slightly smaller diameter portion 66 are disposed two O-rings 70 in axially aligned relation (in a direction parallel to center line C of the pipe 62). The one O-ring 70 is in contact against the stepped portion 67, and the other O-ring 70 is in contact against the inner-side (the operation chamber 13 side) end of a flange 71. Flange 71 is formed by pressing, for example, integrally with the pipe 62 and extends in annular fashion radially outwardly of the cylindrical body of the pipe 62. By being disposed in such compressed condition, the O-rings 70 are in abutment against the inner periphery of the portion 66 and the outer periphery of the pipe 62, thereby sealing them in relation to each other.

In order to axially compress the O-rings 70 as above mentioned, the outer-side (opposite to the O-rings 70) end of the flange 71 is held in position by a pin 75 through an annular wave spring 72 and a spacer 73 which are disposed round the pipe 62.

Figure 6:
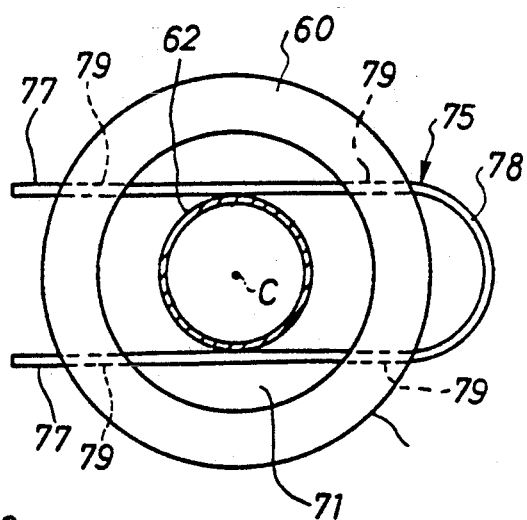
FIG. 6 is a schematic view taken along line VI—VI in FIG. 5.

As FIG. 6 shows, the pin 75 is U-shaped and comprises two parallel linear portions 77 and a curved portion 78 interconnecting the linear portions 77 at their respective one ends, which are integrally formed into one entirety; and the pin 75, as a whole, extends on a plane perpendicular to center line C of the pipe 62. The two linear portions 77 extend straight along both sides of the pipe 62 in contact or adjoining relation to the cylindrical body of the pipe 62. The linear portions 77 are fitted in holes 79 formed in the boss 60 at their respective portions adjacent the curved portion 78 and free end portion.

As FIG. 5 shows, each linear portion 77 has a portion positioned inside the larger diameter hole portion 65 which supports the wave spring 72 through the spacer 73 from the side opposite to the flange 71. The wave spring 72 is, in its circumferential section, curved in wave pattern and is seated on the flange 71 while being axially compressed.

Conventionally, such O-ring 70 is likely to be deteriorated under the influence of pressure and heat of the operation liquid supplied through the control passage 19 into the operation chamber 13, with the result that its resiliency becomes lowered. According to the above described arrangement, however, if the resiliency of the O-ring 70 is lowered, compressive force continues to be applied to the O-ring 70 since the wave spring 72 incorporated in compressed state is axially restored in performance in a measure, and thus the O-ring 70 is maintained in an elastically compressed state. Therefore, the O-ring 70 is maintained in abutment against the outer periphery of the pipe 62 and the inner periphery of the portion 66, so that the pipe 62 and the portion 66 are positively maintained in tightly sealed relation to each other.

Even if vigorous external vibration is exerted on the O-rings, the sealing function of the O-rings is, of course, maintained in same manner.

Figure 7:
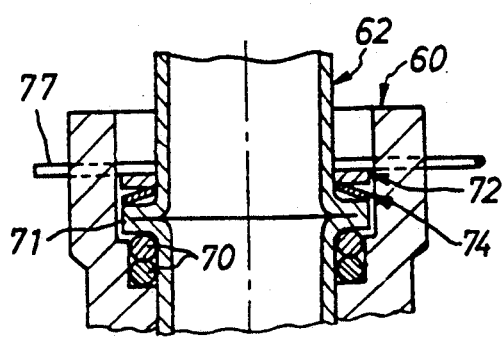
FIG. 7 is a fragmentary enlarged sectional view corresponding to FIG. 5 of another embodiment.

As an alternative to the wave spring 72 shown in FIG. 5, cone spring 74 as shown in FIG. 7 may be used.

With the arrangement shown in FIGS. 5 to 7, it is required that during assembly work for the arrangement, elements other than the pin 75 be assembled in such condition as shown before the pin 75 is mounted in position, and thereafter the pin 79 is inserted into the holes 79 while the other elements are maintained as such, that is, the O-rings 70 and wave spring 72 are maintained in compressed state. In order to simplify the assembly work, the following arrangement may be employed.

Figure 8:
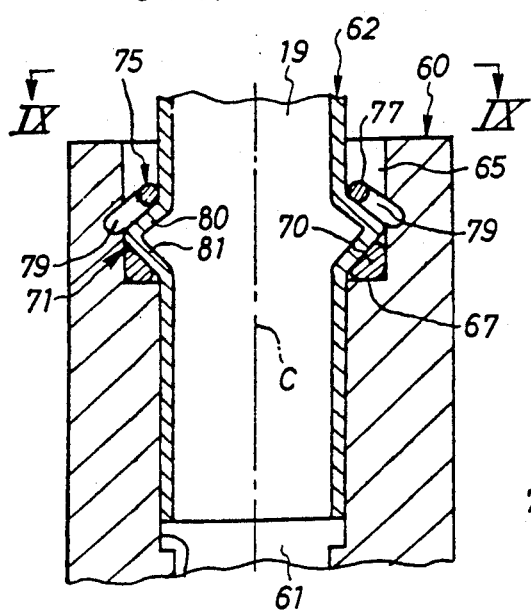
FIG. 8 is a fragmentary enlarged sectional view of a further embodiment.
Figure 9:
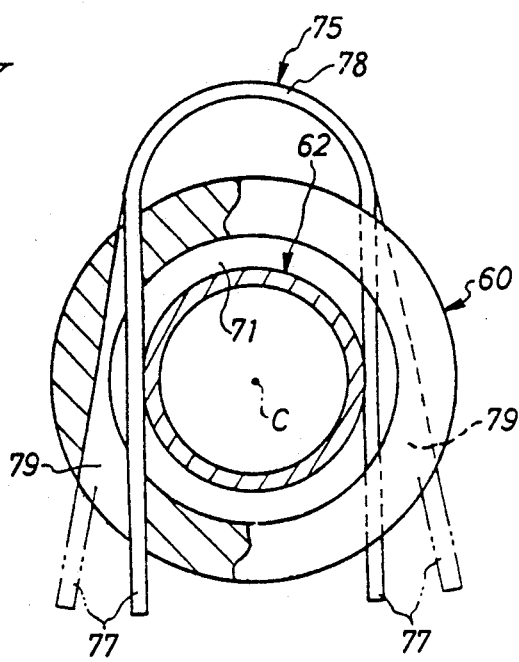
FIG. 9 is a partially cutaway schematic view taken along line IX—IX in FIG. 8.

In FIGS. 8 and 9, two bent annular portions 80, 81 of the pipe 62 which constitute the flange 71 are tapered and one of the portions 80 which is present on outer space side has its outer peripheral edge positioned more adjacent to the O-ring 70 side than its inner peripheral edge, while the other portion 81 which is located on the inner side is inclined in a direction opposite to the portion 80.

In this embodiment, the hole 79 has an oblong sectional configuration which extends along the sectional shape of the portion 80 shown in FIG. 8, so that the distance between the two linear portions 77 of the pin 75 may be extended within the hole 79. More particularly, the pin 75 maintains, in a position as shown by solid line in FIG. 9, a condition in which the distance between the two linear portions 77 is reduced under the self resiliency of the pin 5, that is, a condition in which they are in contact with the outer surface of the pipe 62 or the pipe 62 side edge of the hole 79, but the pin 75 may be deformed by external force to an extended position shown by a two dot chain line thereby to enlarge the distance between the two linear portions 77. The distance between the two linear portions 77 at the extended position is set so that the flange 71 can pass the space between them.

In assembly work, therefore, the O-ring 70 and pin 75 are assembled in place as shown and thereafter the pipe 62 is inserted from outside into the boss 60, whereby the flange 71 is allowed to temporarily force open the pin 75 through its taper portion 81 thereby to pass between the two linear portions 77. After its passage between the linear portions 77, the pin 75 is restored to the FIG. 8 condition under its own resiliency so that it goes in engagement with the portion 80 of the flange 71, the flange 71 being thus held in abutment against the O-ring 71.

Figure 10:
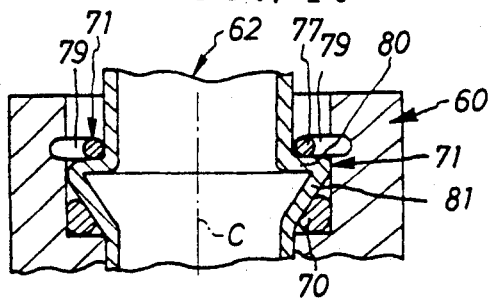
FIG. 10 is a fragmentary enlarged sectional view of a still further embodiment.

The arrangement of FIG. 8 may be modified as shown in FIG. 10. The FIG. 10 arrangement is different from the FIG. 8 arrangement in that the portion 80 and holes 79 of the flange 71 extend along a plane perpendicular to center line C of the pipe 62.

Figure 11:
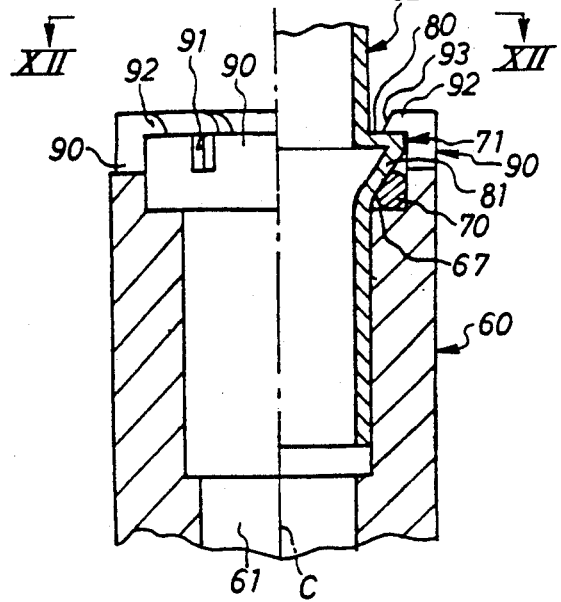
FIG. 11 is a fragmentary enlarged sectional view of still another embodiment.
Figure 12:
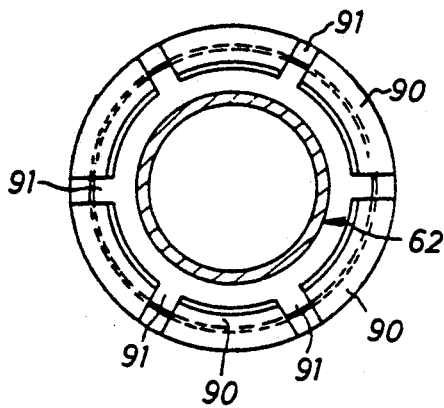
FIG. 12 is a schematic view taken along line XII—XII in FIG. 10.

As means for holding the flange 71 in position, such an arrangement as shown in FIGS. 11 and 12 may be employed in place of the above described pin 75.

In FIGS. 11 and 12, the O-ring 70 and flange 71 are same in construction as those in FIG. 10, and no pin 75 is employed. A plurality of pawls 90 are provided at the open end of the boss 60 in integral relation therewith. Pawls 90 are disposed at six locations, for example, in circumferentially equispaced relation in the cylindrical front end portion of the boss 60 and are separated from one another by notches 91. Each of the pawls 90 has at its front end a radially inwardly extending projection 92 formed integrally therewith.

An inner side end of the projection 92 is, in its assembled state as shown, in engagement with the outer surface of the portion 80 of the flange 71, and the flange 71 is maintained in its O-ring 70 compressing condition by means of the projection 92. Each pawl 90 is tapered at its front end 93 so that it is diametrally is smaller toward the flange 71.

The dimensions of the above mentioned elements and resiliency of the pawls 90 are set so that the various elements can operate as follows.

When the pipe 62 is inserted from outside in the boss 60 with the O-ring 70 disposed as shown, the taper portion 81 of the flange 71 first goes in engagement with the tapered front end portion 93. Accordingly, pawls 90 are elastically deformed to allow the projections 92 thereof to shift radially outwardly, and when the flange 71 has passed the space inside the projections 92, the pawls 90 are elastically restored to their original state. Thereupon, the projections 92 go into engagement with the portion 80 and the flange 71 is maintained in position for compression of the O-ring 70.

According to the invention, as described above, the slide member 41 is provided in conjunction with the packing 40 as shown in FIGS. 3 and 4 to thereby prevent distortion or fall down of the packing 40; therefore, the required sealing function of the packing 40 can be accurately maintained.

According to the arrangement shown in FIGS. 1 and 2, any leakage of operation liquid is collected into the liquid reservoir 30 formed in the cylinder 12, and therefore the operation liquid is prevented from leaking to a location outside the cylinder 12 and adhering to the facing 5 or the like. Hence, possible slippage or judder on the facing 5 can be positively prevented.

Further, since the liquid reservoir 30 is provided at the lower side of the cylinder 12, an increase in the axial length of the cylinder 12 as a whole is prevented, so that the entire release device can be compactly arranged.

According to the arrangement shown in FIGS. 5 to 7, a lowering of the sealing function due to deterioration of the O-rings can be prevented.

According to the arrangement shown in FIGS. 8 to 12, the work involved in connecting the control passage pipe 62 to the boss 60 of the cylinder 12 can be simplified.

In this way the invention provides various advantages by being applied to release devices for automobiles and the like of the type in which a release bearing is driven by a hydraulic cylinder device.

what is claimed is:

1. A release device for a clutch including a cylinder coaxially aligned with a release bearing, a cylindrical piston fitted in a cylindrical operation chamber of the cylinder, and an annular seal mounted in position adjacent an annular end of the piston within said operation chamber, said operation chamber being connected to an external operating pressure control means through a liquid control passage, an end of said piston outside said operating chamber being axially connected to the release bearing, said annular seal comprising an annular slide member and an annular packing, said annular slide member being fixed at one of its ends to said packing and engagable at its other end with said piston, said slide member being greater in hardness and lower in friction coefficient than said packing.

2. A release device for a clutch as set forth in claim 1, further comprising a cylindrical hollow portion defining said cylindrical operation chamber and provided in an axially intermediate portion of the cylinder, said hollow portion having an opening formed in one end of the cylinder on the release bearing side, said piston projecting outward through said opening of said hollow portion said one end of the cylinder being covered with a cover sidably fitted in liquid tight condition on the inner and outer peripheries of the piston, an operation liquid passage formed at the lower end of the cylinder and at a site adjacent said cover which extends from said hollow portion to the outer periphery of the cylinder, and an operation liquid reservoir to which is connected the lower end of said passage.

3. A release device for a clutch as set forth in claim 1, further comprising a pipe defining a cylinder side portion of said liquid pressure control passage, a connecting hole formed in said cylinder for receiving one end of said pipe, an annular stepped portion formed on the inner periphery of the connecting hole, a flange formed on the pipe which is spaced outward from and in opposed relation to said stepped portion, a seal ring interposed in compressed state between said flange and said stepped portion for sealing the space between a cylindrical portion of said pipe and the inner periphery of said connecting hole, spring means seated on said flange at one side opposite to said stepped portion and held in compression in the longitudinal direction of said pipe, and a holding member mounted in said cylinder for supporting said spring means at one side opposite to said flange.

4. A release device for a clutch as set forth in claim 1, further comprising a pipe defining a portion on the cylinder side of said liquid pressure control passage, a connecting hole formed in said cylinder for receiving one end of said pipe, an annular stepped portion formed on the inner periphery of the connecting hole, a flange formed on the pipe which is spaced outward from and in opposed relation to said stepped portion, a seal ring interposed in compressed state between said flange and said stepped portion for sealing the space between a cylindrical portion of said pipe and the inner periphery of said connecting hole, a holding member disposed in said cylinder for supporting said flange at one side opposite to said stepped portion, said holding member being resiliently deformable between a deformed state position and an original position, whereby in said deformed state position of said holding member, said flange is allowed to shift from a position outside said connecting hole to a position at which said flange abuts against said seal ring and, at said original position, said holding member is so maintained as to compress said seal ring.

* * * * *